(12) United States Patent
Matsubara (10) Patent No.: US 9,046,750 B2
(45) Date of Patent: Jun. 2, 2015

(54) PROJECTOR LIGHT SOURCE APPARATUS HAVING COLLIMATOR DISPOSED BETWEEN EXCITATION LIGHT SOURCE AND PHOSPHOR ELEMENT

(75) Inventor: Masateru Matsubara, Tokyo (JP)

(73) Assignee: NEC Display Solutions, Ltd., Tokyo (JP)

(*) Notice: Subject to any disclaimer, the term of this patent is extended or adjusted under 35 U.S.C. 154(b) by 135 days.

(21) Appl. No.: 13/883,977

(22) PCT Filed: Nov. 17, 2010

(86) PCT No.: PCT/JP2010/070484
§ 371 (c)(1),
(2), (4) Date: May 7, 2013

(87) PCT Pub. No.: WO2012/066654
PCT Pub. Date: May 24, 2012

(65) Prior Publication Data
US 2013/0222772 A1 Aug. 29, 2013

(51) Int. Cl.
*G03B 21/20* (2006.01)
*H04N 9/31* (2006.01)
(Continued)

(52) U.S. Cl.
CPC .......... *G03B 21/204* (2013.01); *G03B 21/2033* (2013.01); *G03B 21/208* (2013.01); *H04N 9/3161* (2013.01); *G03B 21/2066* (2013.01); *G03B 33/06* (2013.01); *F21V 13/14* (2013.01)

(58) Field of Classification Search
CPC .. G03B 21/20; G03B 21/2033; G03B 21/204; G03B 21/2066; G03B 21/2093; G03B 21/208; H04N 9/31; H04N 9/3114; H04N 9/3117; H04N 9/3138; H04N 9/3161; H04N 9/3164
USPC .......... 353/30–31, 33, 37, 84–85, 94, 98–99; 359/885, 887, 889–892; 362/84, 362/217.08, 230–231, 235–236, 260, 293
See application file for complete search history.

(56) References Cited

U.S. PATENT DOCUMENTS 8,002,413 B2 * 8/2011 Narikawa ......................... 353/37
8,052,279 B2 * 11/2011 Wang et al. ...................... 353/31
(Continued)

FOREIGN PATENT DOCUMENTS

CN          1755421 A     4/2006
CN     101496186 A     7/2009
(Continued)

OTHER PUBLICATIONS

International Search Report in PCT/JP2010/070484 dated Feb. 22, 2011(English Translation Thereof).
(Continued)

*Primary Examiner* — Jori S Reilly-Diakun
(74) *Attorney, Agent, or Firm* — McGinn IP Law Group, PLLC (57) ABSTRACT

A light source apparatus includes excitation light sources, a phosphor unit, a dichroic mirror that reflects excitation light supplied from the excitation light sources toward the phosphor unit and that transmits fluorescent light emitted from the phosphor unit, and a collimator lens that is provided between the dichroic mirror and the phosphor unit and whose focal distance varies according to the wavelength. The phosphor unit is arranged at a position determined by the focal distance of the collimator lens for the fluorescent wavelength. The collimator lens includes low-dispersion lenses and a high-dispersion lens.

15 Claims, 8 Drawing Sheets

(51) Int. Cl.
    *G03B 33/06*     (2006.01)
    *F21V 13/14*     (2006.01)

(56) References Cited

U.S. PATENT DOCUMENTS

| | | | |
|---|---|---|---|
| 8,167,440 B2* | 5/2012 | Sato et al. | 353/99 |
| 8,562,141 B2* | 10/2013 | Ogino | 353/38 |
| 8,858,000 B2* | 10/2014 | Tsuda et al. | 353/85 |
| 2005/0270775 A1* | 12/2005 | Harbers et al. | 362/231 |
| 2006/0262514 A1 | 11/2006 | Conner et al. | |
| 2008/0019001 A1 | 1/2008 | Suzuki | |
| 2009/0034284 A1* | 2/2009 | Li et al. | 362/554 |
| 2009/0262308 A1* | 10/2009 | Ogawa | 353/31 |
| 2009/0284148 A1* | 11/2009 | Iwanaga | 313/506 |
| 2010/0149496 A1* | 6/2010 | Inoue | 353/98 |
| 2010/0245777 A1 | 9/2010 | Ogura | |
| 2010/0328554 A1* | 12/2010 | Shibasaki | 348/760 |
| 2010/0328617 A1* | 12/2010 | Masuda | 353/31 |
| 2010/0328625 A1* | 12/2010 | Miyazaki et al. | 353/85 |
| 2010/0328627 A1* | 12/2010 | Miyazaki | 353/85 |
| 2010/0328628 A1* | 12/2010 | Masuda | 353/85 |
| 2010/0328632 A1* | 12/2010 | Kurosaki et al. | 353/98 |
| 2011/0043765 A1* | 2/2011 | Shibasaki | 353/31 |
| 2011/0051102 A1* | 3/2011 | Ogura et al. | 353/85 |
| 2011/0063581 A1* | 3/2011 | Iwanaga | 353/31 |
| 2011/0075103 A1* | 3/2011 | Ogawa et al. | 353/31 |
| 2011/0075106 A1* | 3/2011 | Shibasaki | 353/31 |
| 2011/0096296 A1* | 4/2011 | Ogawa | 353/31 |
| 2011/0096297 A1* | 4/2011 | Ogino et al. | 353/31 |
| 2011/0096300 A1* | 4/2011 | Shibasaki | 353/85 |
| 2011/0234998 A1* | 9/2011 | Kurosaki | 353/85 |
| 2011/0242497 A1* | 10/2011 | Fukano | 353/31 |
| 2011/0317131 A1* | 12/2011 | Miyazaki | 353/31 |
| 2012/0026472 A1* | 2/2012 | Masuda | 353/85 |
| 2012/0062857 A1* | 3/2012 | Saitou et al. | 353/98 |
| 2012/0140185 A1* | 6/2012 | Masuda | 353/31 |
| 2012/0147331 A1* | 6/2012 | Miyazaki | 353/31 |
| 2013/0194552 A1* | 8/2013 | Matsubara et al. | 353/31 |
| 2013/0215397 A1* | 8/2013 | Matsubara | 353/57 |
| 2013/0322056 A1* | 12/2013 | Konuma et al. | 362/84 |
| 2014/0125956 A1* | 5/2014 | Chifu et al. | 353/31 |
| 2014/0333901 A1* | 11/2014 | Hartwig et al. | 353/31 |

FOREIGN PATENT DOCUMENTS

| | | |
|---|---|---|
| EP | 1 308 767 A2 | 5/2003 |
| EP | 1 605 199 A2 | 12/2005 |
| JP | 2003-295319 A | 10/2003 |
| JP | 2004-327361 A | 11/2004 |
| JP | 2004-341105 A | 12/2004 |
| JP | 2009-150938 A | 7/2009 |
| WO | WO 2010/068974 A1 | 6/2010 |

OTHER PUBLICATIONS

Chinese Office Action dated Sep. 23, 2014 with an English translation thereof.
European Search Report dated Nov. 18, 2014.

\* cited by examiner

| Surface number | | Curvature radius | Spacing | Index of refraction (d ray) | Abbe number |
|---|---|---|---|---|---|
| 0 | Phosphor | Infinity | 1.2 | | |
| 1 | L1 | Infinity | 4 | 1.648 | 33.8 |
| 2 | | -2.96967 | 1 | | |
| 3 | L2 | 17 | 5 | 1.648 | 33.8 |
| 4 | | -17 | 5.7 | | |
| 5 | L3 | Infinity | 2.5 | 1.517 | 64.2 |
| 6 | | 16.43 | - | | |

Fig.6B

| Fno | 0.2 inch | 0.3 inch |
|---|---|---|
| 1.8 | 3.0 | 6.8 |
| 2 | 2.4 | 5.5 |
| 2.2 | 2.0 | 4.5 |
| 2.4 | 1.7 | 3.8 |

(The units of Etendue are mm2/sr)

Fig.6C

| Fno | 0.2 inch | 0.3 inch |
|---|---|---|
| 1.8 | φ1.1 | φ1.7 |
| 2 | φ1.0 | φ1.5 |
| 2.2 | φ0.9 | φ1.4 |
| 2.4 | φ0.8 | φ1.2 |

(The units of radius φ are mm)

Fig.6D

| Surface number | 2 |
|---|---|
| k | −0.549774 |
| $\alpha_1$ | 0.000E+00 |
| $\alpha_2$ | −1.363E−03 |
| $\alpha_3$ | −1.373E−04 |
| $\alpha_4$ | 1.313E−05 |
| $\alpha_5$ | 1.956E−07 |

PROJECTOR LIGHT SOURCE APPARATUS HAVING COLLIMATOR DISPOSED BETWEEN EXCITATION LIGHT SOURCE AND PHOSPHOR ELEMENT

TECHNICAL FIELD

The present invention relates to a light source apparatus that uses a phosphor.

BACKGROUND ART

Some recent projectors use a light source apparatus that uses a phosphor as a light source. A light source apparatus includes an excitation light source that supplies excitation light and a phosphor unit that emits fluorescent light (visible light) by the excitation caused by excitation light that is supplied from the excitation light source.

In the above-described projector, fluorescent luminous flux that is emitted from the phosphor unit is irradiated upon a display element, and image light that is formed by the display element is projected upon a screen by projection lenses.

In the above-described light source apparatus, however, excitation light is always irradiated upon the same region of the phosphor unit, and damage (such as burns) to the phosphor caused by the excitation light may therefore occur if the intensity of the excitation light is high.

A projection-type display apparatus has therefore been proposed in which damage to the phosphor by excitation light can be mitigated (Patent Document 1).

The projection-type display apparatus described in Patent Document 1 includes: a light-emitting diode that supplies ultraviolet light, a color wheel that converts the ultraviolet light that is supplied from the light-emitting diode to visible light, a spatial modulator that is irradiated by the visible light from the color wheel, and projection lens that projects the modulated light from the spatial modulator onto a screen.

The color wheel includes a transparent substrate that can rotate, a phosphor layer that is formed on one surface of the transparent substrate, and a visible-light-reflecting layer that is formed on the other surface of the transparent substrate and that transmits ultraviolet light and reflects visible light.

The ultraviolet light from the light-emitting diode is irradiated onto the surface of the visible-light-reflecting layer of the color wheel while the color wheel is being rotated. The irradiated ultraviolet light reaches the phosphor layer and excites the phosphor. The fluorescent light that is emitted from the phosphor exits from the phosphor wheel as visible light.

Of the fluorescent light that is emitted from the phosphor, the fluorescent light that is directed toward the transparent substrate, after passing through the transparent substrate, is reflected toward the transparent substrate side at the visible-light-reflecting layer. The reflected light from the visible-light-reflecting layer transmits through the transparent substrate and the phosphor layer.

According to the above-described projection-type display apparatus, rotating the color wheel causes the light spot of the excitation light to move over the phosphor layer, whereby damage to the phosphor due to the excitation light can be mitigated.

LITERATURE OF THE PRIOR ART

Patent Documents

Patent Document 1: Japanese Unexamined Patent Publication Number 2004-341105

SUMMARY OF THE INVENTION

Nevertheless, the projection-type display apparatus described in Patent Document 1 requires a rotation drive system for rotating the color wheel, and this results in the apparatus having both a larger size and increased cost.

It is an object of the present invention to provide a compact and low-cost light source apparatus that can mitigate damage to the phosphor caused by the excitation light without using a rotation drive system.

It is yet another object of the present invention to provide a lighting apparatus and projection-type display apparatus that use this light source apparatus.

The light source apparatus of the present invention for achieving the above-described objects includes:

a phosphor unit that emits fluorescent light due to the excitation caused by excitation light;

an excitation light source unit that supplies the excitation light;

a reflection unit that reflects the excitation light that is supplied from the excitation light source unit toward the phosphor unit and that transmits the fluorescent light that is emitted from the phosphor unit; and collimator lens that is provided between the reflection unit and the phosphor unit and whose focal distance differs according to wavelength;

wherein:

the phosphor unit is disposed at a position determined by the focal distance of the collimator lens at the wavelength of the fluorescent light that is emitted from the phosphor unit; and the collimator lens includes at least one first lens having a negative power and at least one second lens having a positive power, the Abbe number of the second lens being smaller than that of the first lens.

The lighting apparatus of the present invention includes:

the above-described light source apparatus;

first and second solid-state light sources whose emitted light colors differ from each other; and color-combining means that combines fluorescent light that is supplied from the light source apparatus and first and second light that are supplied from the first and second solid-state light sources.

The projection-type display apparatus of the present invention includes:

the above-described light source apparatus;

first and second solid-state light sources whose emitted colors differ;

color-combining means that combines fluorescent light that is supplied from the light source apparatus and first and second light that are supplied from the first and second solid-state light sources;

a display element that spatially modulates the combined light that is combined by the color-combining means to generate modulated light; and projection optics that project the modulated light that was generated by the display element.

EXPLANATION OF REFERENCE NUMBERS 12, 13 excitation light source
14 phosphor unit
15, 18, 19 collimator lens
51a dichroic mirror

BEST MODE FOR CARRYING OUT THE INVENTION

The exemplary embodiment of the present invention is next described with reference to the accompanying drawings.

Figure 1:
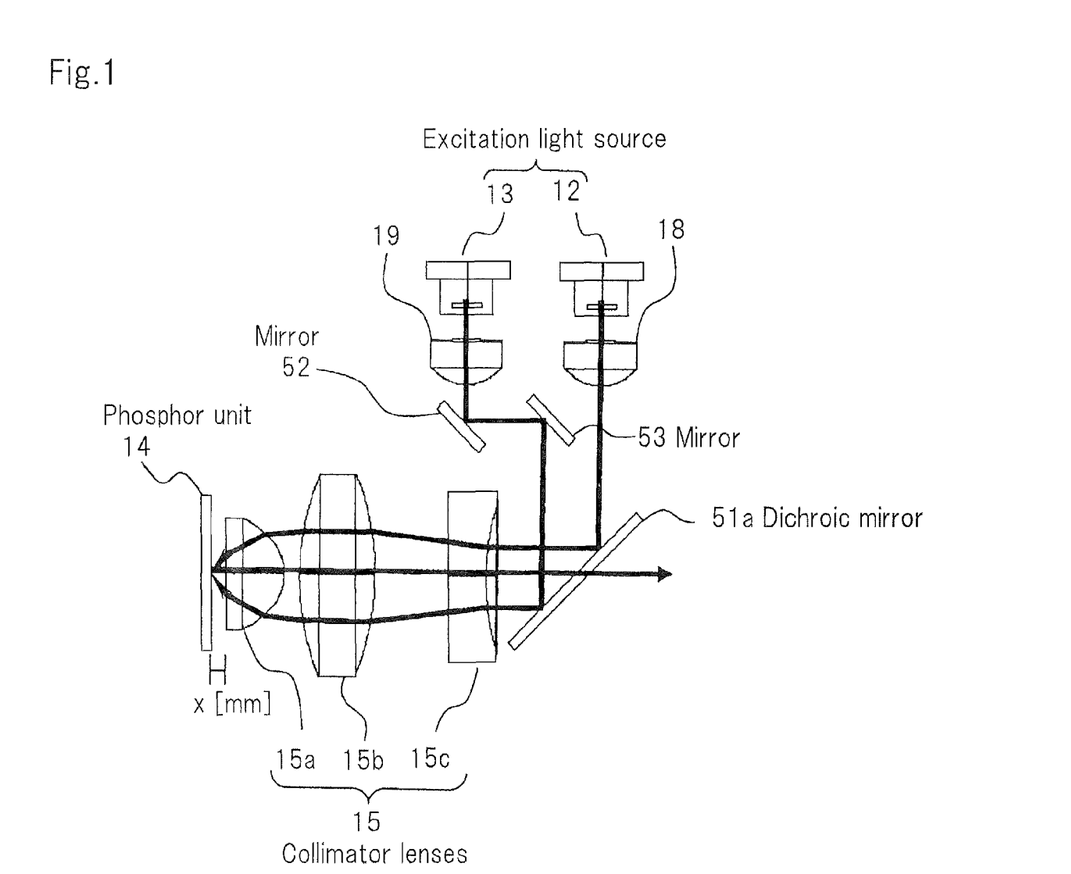
FIG. 1 is a schematic view showing the light source apparatus that is an exemplary embodiment of the present invention.

FIG. 1 is a schematic view showing the configuration of the light source apparatus that is an exemplary embodiment of the present invention.

Referring to FIG. 1, the light source apparatus is a device used in a projection-type display apparatus such as a projector and includes: excitation light sources 12 and 13, phosphor unit 14, collimator lenses 15, 18, and 19, dichroic mirror 51a, and light path changing mirrors 52 and 53.

In FIG. 1, each of the light paths of excitation light that are supplied from excitation light sources 12 and 13 and the light path of fluorescent light that is emitted from phosphor unit 14 are shown by solid lines (heavy lines) with arrows. The light paths of each color are all indicated only by the light paths of the center rays, but the light is actually luminous flux composed of a plurality of light rays.

Phosphor unit 14 includes a substrate and a phosphor layer that is formed on one surface of the substrate. A transparent substrate is used as the substrate, a reflection film that reflects the emitted color of the fluorescent light is provided on this transparent substrate, and a phosphor layer is applied with a uniform thickness onto this reflection film.

The emitted color of the phosphor that forms the phosphor layer is, for example, green, and the excitation of this phosphor by excitation light of a shorter wavelength than the green wavelength causes green fluorescent light to be emitted from the phosphor layer. The phosphor color may be a color other than green, and may be, for example, red or blue.

Excitation light sources 12 and 13 are light sources that supply S-polarized excitation light of a wavelength that is shorter than the wavelength of green fluorescent light and are constituted by solid-state light sources of which, for example, a blue laser or a blue LED is representative. When the emitted color of the phosphor is a color other than green, excitation light sources 12 and 13 supply S-polarized excitation light of a wavelength that is shorter than the wavelength of the fluorescent light of this color.

The excitation light that is supplied from excitation light source 12 is irradiated into dichroic mirror 51a at an angle of incidence of approximately 45°. The light path of the excitation light that is supplied from excitation light source 13 is altered by mirrors 52 and 53 and then irradiated into dichroic mirror 51a at an angle of incidence of approximately 45°.

Dichroic mirror 51a reflects excitation light from excitation light sources 12 and 13 toward phosphor unit 14 and transmits fluorescent light (green) that is emitted from phosphor unit 14.

Figure 2:
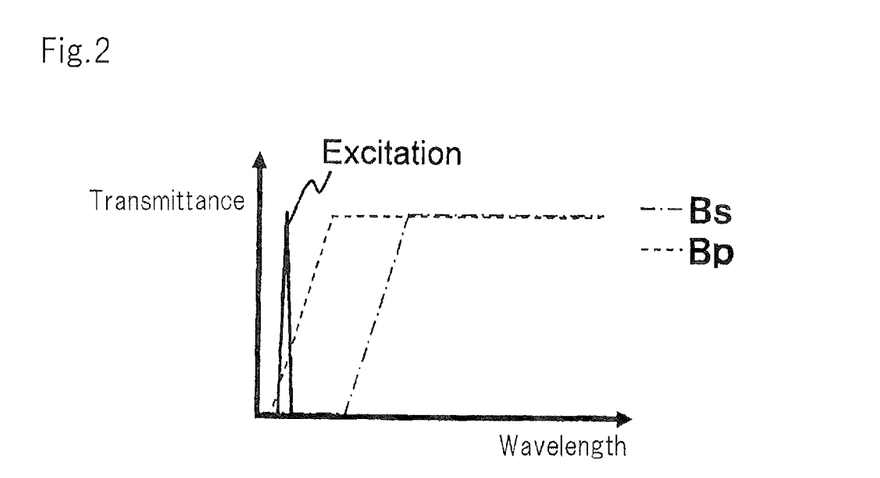
FIG. 2 is a graph showing the spectral transmission characteristics with respect to P-polarized light and S-polarized light of the dichroic mirror of the light source apparatus shown in FIG. 1.

FIG. 2 shows the spectral transmission characteristics with respect to P-polarized light and S-polarized light of dichroic mirror 51a. In FIG. 2, the spectral transmission characteristic with respect to S-polarized light is shown by alternate long and short dash lines, and the spectral transmission characteristic with respect to P-polarized light is shown by broken lines. The spectrum (Excitation) on the low-wavelength side is the spectrum of the excitation light that is supplied from excitation light sources 12 and 13.

The cutoff wavelength is defined as the wavelength at which the transmittance becomes 50%. The cutoff wavelength of dichroic mirror 51a with respect to light that is entered as S-polarized light is set to reflect light of a wavelength that is equal to or shorter than the blue wavelength band and transmit light of other wavelength bands (including the green and red wavelength bands). The cutoff wavelength of dichroic mirror 51a with respect to light that is entered as P-polarized light is set to wavelengths that are shorter than the cutoff wavelength with respect to S-polarized light. The setting of the cutoff wavelength can be adjusted by means of, for example, the material, number of layers, film thickness, and refractive index of the dielectric multilayer films.

In dichroic mirror 51a having the spectral transmission characteristics shown in FIG. 2, S-polarized light whose wavelength is equal to or shorter than the blue wavelength band is reflected, and S-polarized light and P-polarized light of wavelengths of the green and red wavelength bands pass through dichroic mirror 51a.

Again referring to FIG. 1, collimator lens 15 both acts to convert green fluorescent light (divergent light) that is emitted from the phosphor region of phosphor unit 14 to parallel luminous flux (first action) and to condense the excitation light from excitation light sources 12 and 13 in a state in which a certain defocus amount is provided on phosphor unit 14 (second action). Here, a state having a defocus amount means that the excitation light is not condensed on one point on phosphor unit 14.

In the present exemplary embodiment, collimator lens 15 having the first and second actions is realized by constructively using a phenomenon by which the size and position of an image shifts due to color dispersion in which refractive index changes according to wavelength.

More specifically, collimator lens 15 is composed of two convex lenses 15a and 15b and one concave lens 15c. Lenses 15a and 15b are high-dispersion lenses having positive power. Lens 15c is a low-dispersion lens having negative power.

Due to the occurrence of color dispersion in collimator lens 15 that has high-dispersion lenses having positive power and a low-dispersion lens having negative power, the refractive index is changed by wavelength, whereby a difference occurs between the focal distance for the wavelength of fluorescent light and the focal distance for the wavelength of excitation light.

Accordingly, if phosphor unit 14 is disposed at the position of the focal distance for the wavelength of fluorescent light of collimator lens 15, green fluorescent light (divergent light) that is emitted from phosphor unit 14 can be converted to parallel luminous flux, and excitation light from excitation light sources 12 and 13 can be condensed in a state having a certain defocus amount on phosphor unit 14, whereby the first and second actions are realized.

By means of the first and second actions, damage to the phosphor caused by excitation light can be mitigated without using a rotation drive system, and reduction of the optical utilization efficiency can be prevented.

The principles for realizing simultaneous mitigation of damage to the phosphor caused by the excitation light and preventing a reduction of optical utilization efficiency by means of the first and second actions are next described in specific terms.

Explanation first regards the relationship between the region on phosphor unit 14 that is irradiated by excitation light and the optical utilization efficiency of fluorescent light that is emitted from this irradiated region when the distance x (mm) between lens 15a of collimator lens 15 and phosphor unit 14 is changed. Here, the region that is irradiated by excitation light corresponds to size of the spot of the excitation light on phosphor unit 14.

FIGS. 3A-3H give schematic representations of the region that is irradiated by excitation light when the distance x (mm) is changed in increments of 0.05 mm over a range of 1.00 mm to 1.35 mm. The wavelength of excitation light that is supplied from excitation light sources 12 and 13 is 445 nm.

Figure 3A:
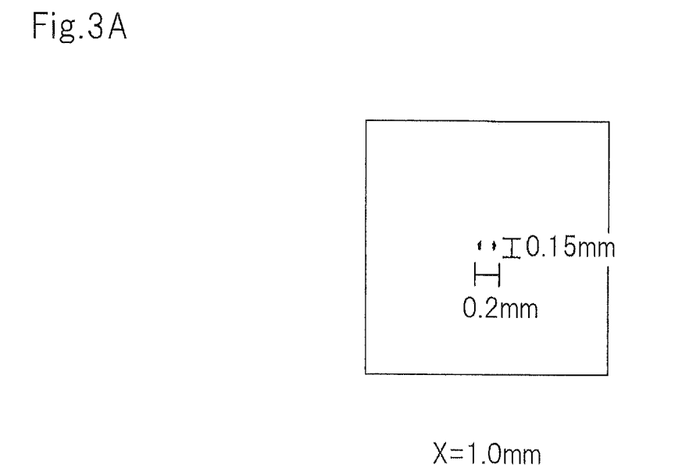
FIG. 3A is a schematic view showing an example of the irradiated region of excitation light.

FIG. 3A is an example of the irradiated region when distance x (mm) is 1.00 mm. The area of the irradiated region is 0.03 mm² (=0.15 mm×0.20 mm).

Figure 3B:
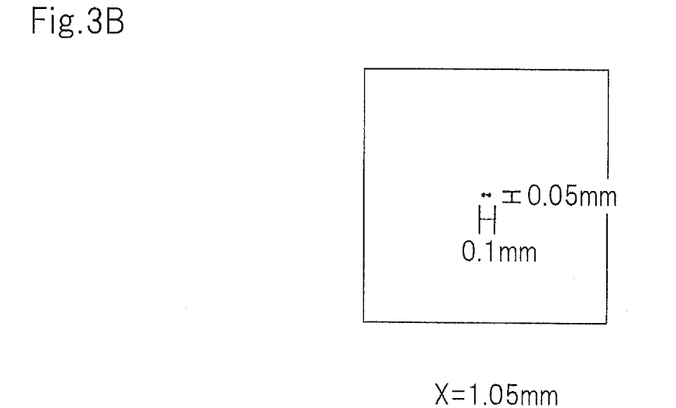
FIG. 3B is a schematic view showing another example of the irradiated region of excitation light.

FIG. 3B is an example of the irradiated region when distance x (mm) is 1.05 mm. The area of the irradiated region is 0.005 mm² (=0.1 mm×0.05 mm).

Figure 3C:
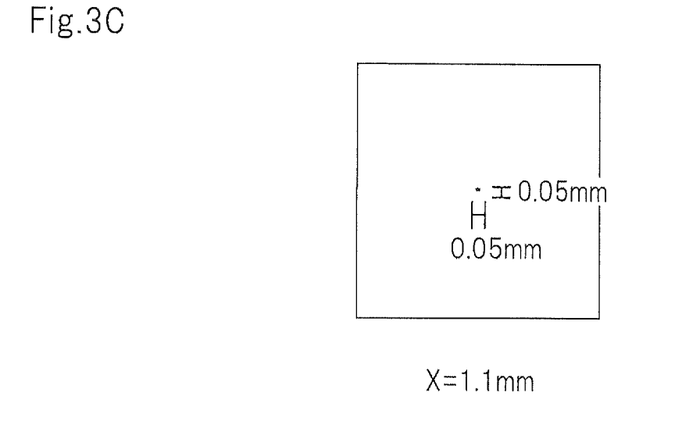
FIG. 3C is a schematic view showing another example of the irradiated region of excitation light.

FIG. 3C is an example of the irradiated region when distance x (mm) is 1.10 mm. The area of the irradiated region is 0.0025 mm² (=0.05 mm×0.05 mm).

Figure 3D:
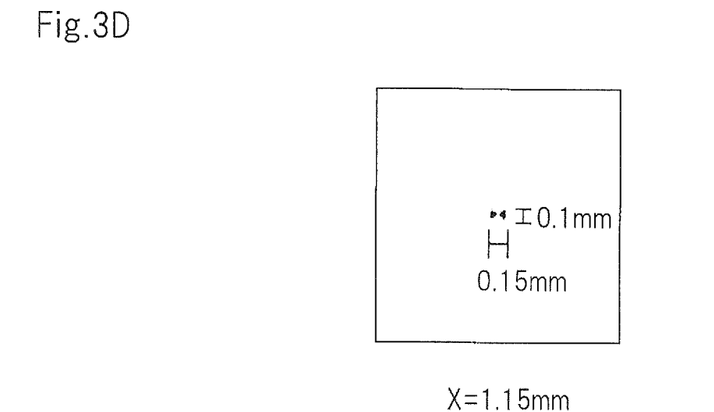
FIG. 3D is a schematic view showing another example of the irradiated region of excitation light.

FIG. 3D is an example of the irradiated region when distance x (mm) is 1.15 mm. The area of the irradiated region is 0.015 mm² (=0.15 mm×0.1 mm).

Figure 3E:
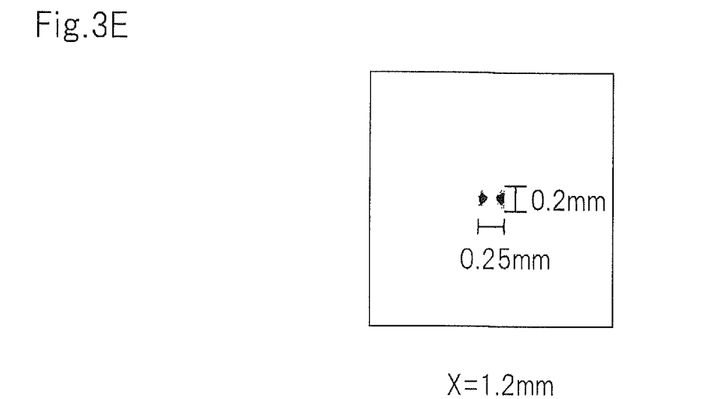
FIG. 3E is a schematic view showing another example of the irradiated region of excitation light.

FIG. 3E is an example of the irradiated region when distance x (mm) is 1.20 mm. The area of the irradiated region is 0.05 mm² (=0.25 mm×0.2 mm).

Figure 3F:
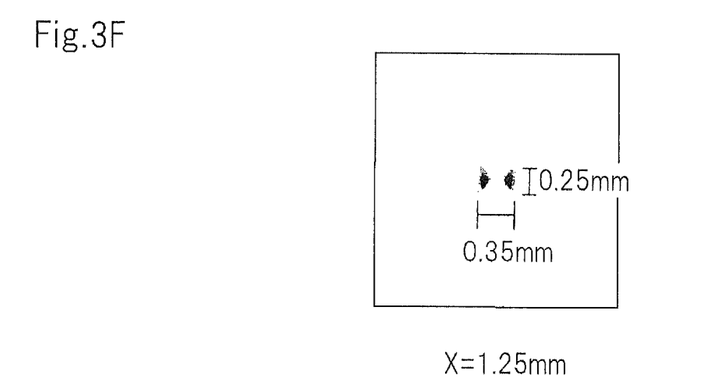
FIG. 3F is a schematic view showing another example of the irradiated region of excitation light.

FIG. 3F is an example of the irradiated region when distance x (mm) is 1.25 mm. The area of the irradiated region is 0.0875 mm² (=0.35 mm×0.25 mm)

Figure 3G:
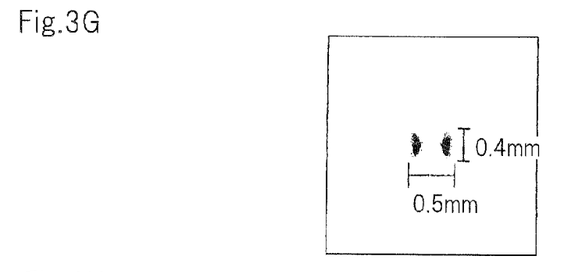
FIG. 3G is a schematic view showing another example of the irradiated region of excitation light.

FIG. 3G is an example of the irradiated region when distance x (mm) is 1.30 mm. The area of the irradiated region is 0.22 mm² (=0.55 mm×0.4 mm).

Figure 3H:
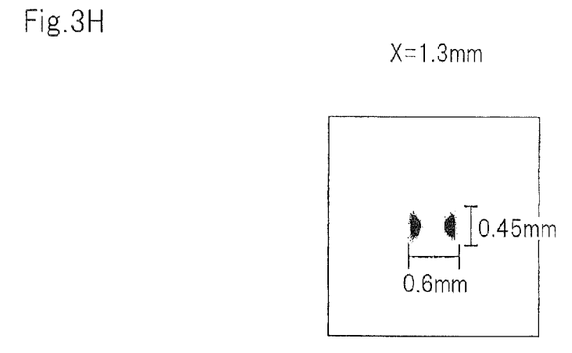
FIG. 3H is a schematic view showing another example of the irradiated region of excitation light.

FIG. 3H is an example of the irradiated region when distance x (mm) is 1.35 mm. The area of the irradiated region is 0.27 mm² (=0.6 mm×0.45 mm).

As shown in FIGS. 3A-3H, the size of the irradiated region changes according to the value of distance x. When distance x is 1.10 mm, the size of the irradiated region is a minimum, and in this state, phosphor unit 14 is disposed in the vicinity of the focal distance of collimator lens 15 for light of a wavelength of 445 nm.

Figure 4:
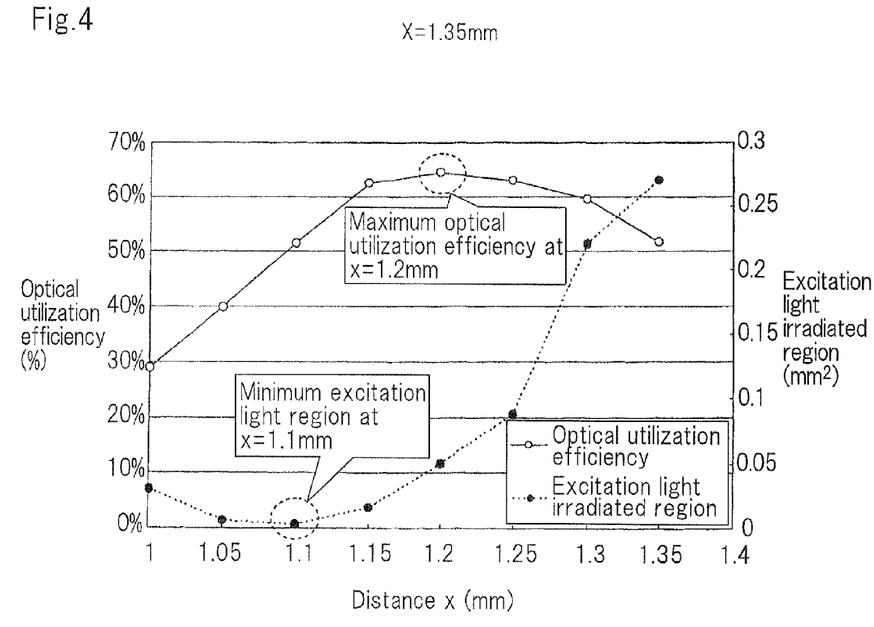
FIG. 4 is a graph showing the result of calculating optical utilization efficiency for each of the irradiation regions shown in FIGS. 3A-3H.

FIG. 4 shows the result of calculating the optical utilization efficiency for each of the irradiation regions shown in FIGS. 3A-3H by means of a computer. The minimum required configuration of the projection-type display apparatus shown in FIG. 5 in which the light source apparatus of the present exemplary embodiment is applied was used in this calculation.

Figure 5:
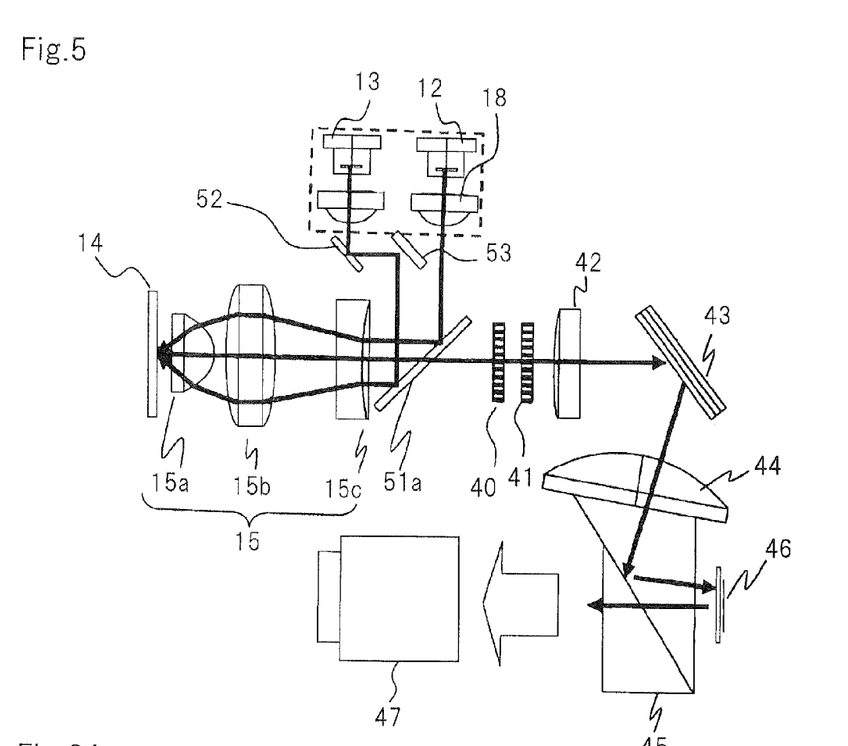
FIG. 5 is a schematic view for describing the projection-type display apparatus that is equipped with the light source apparatus shown in FIG. 1 that was used for calculating the characteristics shown in FIG. 4.

In the example shown in FIG. 5, fluorescent light that is transmitted through dichroic mirror 51a is irradiated onto DMD 46 by way of optics.

The optics include: fly-eye lenses 40 and 41, field lens 42, mirror 43, condenser lens 44, and total internal reflection (TIR) prism 45.

Fly-eye lenses 40 and 41, field lens 42, and mirror 43 are arranged in this order in the direction of advance of fluorescent light that is transmitted by dichroic mirror 51a.

Condenser lens 44 and TIR prism 45 are arranged in this order in the direction of advance of light that is reflected by mirror 43.

Fly-eye lenses 40 and 41 are components for obtaining rectangular and uniform illumination light on the irradiated surface of DMD 46, are each made up of a plurality of micro-lenses, and are arranged such that the micro-lenses have a one-to-one correspondence.

Light that is transmitted through fly-eye lenses 40 and 41 is irradiated into TIR prism 45 by way of field lens 42, mirror 43, and condenser lens 44.

TIR prism 45 is made up of two triangular prisms. Light that was condensed by condenser lens 44 enters into TIR prism 45 from the side surface of one of the triangular prisms. In TIR prism 45, the incident light undergoes total reflection at the inclined surfaces of the triangular prisms and this reflected light exits toward DMD 46 from the other surface of the triangular prisms. Because the surface at which the two triangular prisms are joined is also the total reflection surface, an air layer is necessary between the two surfaces. Accordingly, when the two triangular prisms are joined together, an air layer is provided between the two triangular prisms by interposing spacers and then bonding the prisms.

DMD 46 spatially modulates light that enters from TIR prism 45. The modulated light (image light) from DMD 46 again enters into TIR prism 45 from the other surface of the triangular prism, and this incident image light passes without alteration through the junction surface of the triangular prisms and exits from the side surface of the other triangular prism.

The modulated light that exits from DMD 46 by way of TIR prism 45 is projected upon an external screen by projection optics 47.

FIG. 4 shows the result of calculating, as the optical utilization efficiency, the ratio of the amount of fluorescent light that enters to projection optics 47 to the amount of light of fluorescent light that is emitted from the irradiated regions for each of the irradiated regions shown in FIGS. 3A-3H in the construction shown in FIG. 5.

In FIG. 4, the graph shown by solid lines with white circles shows the change in the optical utilization efficiency with respect to distance x, and the graph shown by broken lines with black circles shows the change in the size of the irradiated regions with respect to distance x.

As shown in FIG. 4, the magnitude of the optical utilization efficiency changes according to the value of distance x. Because the magnitude of the optical utilization efficiency is at a maximum when distance x is 1.20 mm, phosphor unit 14 is disposed in the vicinity of the focal distance of collimator lens 15 for the wavelength of fluorescent light (here, the wavelength of green) in this state. In other words, the degree of conversion to parallel luminous flux of fluorescent light by collimator lens 15 is in the optimum state when distance x is 1.20 mm.

On the other hand, because the size of the irradiated region is smallest when distance x is 1.10 mm, phosphor unit 14 is arranged in the vicinity of the focal distance of collimator lens 15 for a wavelength of 445 nm (the wavelength of excitation light) in this state.

According to the results shown in FIG. 4, the focal distance of collimator lens 15 differs according to the wavelength, and arranging phosphor unit 14 at the position of the focal distance of collimator lens 15 that corresponds to the wavelength of fluorescent light (for example, the position at which the distance x is 1.2 mm) enables an increase in the optical utilization efficiency. In this case, the excitation light is condensed on phosphor unit 14 by means of collimator lens 15 in a state that includes a certain defocus amount, whereby the optical energy density per unit area on phosphor unit 14 decreases and the damage to the phosphor can be mitigated.

Chromatic aberration is normally corrected by forming each of a convex lens and a concave lens that use two types of glass having different dispersion and then combining the convex lens and concave lens. Within the range of the wavelength of visible light, light of shorter wavelengths is more strongly condensed by a convex lens. On the other hand, light of shorter wavelengths is more strongly dispersed by a concave lens. The dispersive action of a concave lens is less than the convergent action of a convex lens, but using high-dispersion glass having a low Abbe number (or reciprocal dispersion) for the concave lens can make the image formation point match for light of different wavelengths.

The Abbe number (or reciprocal dispersion) is an index for appraising the chromatic dispersion (change in refractive index due to wavelength) of a transparent body. Abbe number $v_d$ is expressed by the following formula:

$$v_d = (n_d - 1) \div (n_F - n_C)$$

Here, "d" represents the d ray (587.5618 nm), "F" represents the F ray (486.1327 nm), and "C" represents the C ray (656.2725 nm). A case in which the Abbe number $v_d$ is high is called low dispersion, and in contrast, a case in which the value of the Abbe number is low is called high dispersion. Typically, low-dispersion glass for which the value of Abbe number $v_d$ is greater than 50 is called "crown glass," and high-dispersion glass for which the Abbe number $v_d$ is 50 or lower is called "flint glass."

The correction of chromatic aberration normally calls for the use of a combination of a lens (convex lens) composed of low-dispersion glass having a positive power and a lens (concave lens) composed of high-dispersion glass having a negative power.

When a collimator lens is also used as a condenser lens, fluorescent light can be collimated, and moreover, excitation light can be condensed at one point when chromatic aberration is cancelled by means of chromatic aberration correction. When the condensing spot of excitation light is made small, the energy density increases and the efficiency of fluorescent light emission is increased. In this case, however, the phosphor may be burned by the excitation light (damage to the phosphor).

In the present exemplary embodiment, in contrast, collimator lens 15 is configured such that chromatic aberration is produced. More specifically, collimator lens 15 includes high-dispersion lenses 15a and 15b that have a positive power and low-dispersion lens 15c that has a negative power. The combination of these lenses 15a-15c are in a relation that is the absolute opposite of the combination when carrying out the above-described correction of chromatic aberration. As a result, the above-described first and second actions are realized and damage to the phosphor by the excitation light is reduced.

Figure 6A:
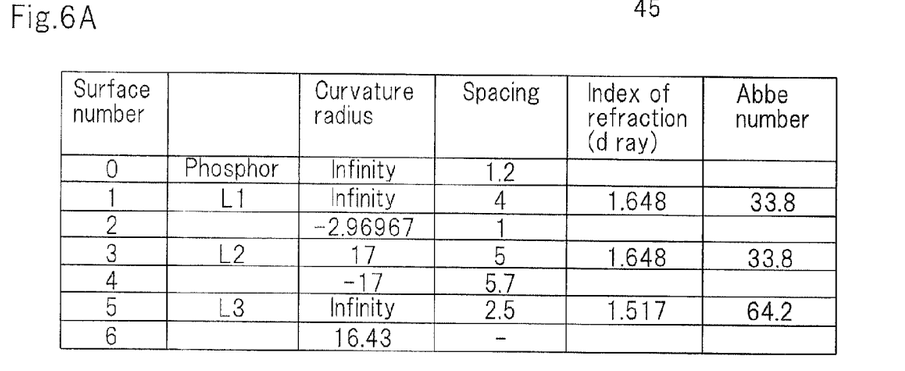
FIG. 6A is a view for describing an example of the design data of the collimator lens of the light source apparatus shown in FIG. 1.

FIG. 6A shows an example of the design data relating to lenses 15a-15c of collimator lens 15.

In FIG. 6A, L1, L2, and L3 correspond to lenses 15a, 15b, and 15c, respectively. Surface numbers 1-6 correspond to each of the surfaces of lenses 15a-15c, and numbers are assigned in order on the phosphor unit 14 side. Surface number 0 indicates the surface of phosphor unit 14. A curvature radius of negative value indicates that the shape of the surface when viewed from the side of phosphor unit 14 is concave. A curvature radius of positive value indicates that the shape of the surface when viewed from the phosphor unit 14 side is convex.

The surface on the phosphor unit 14 side of lens 15a (L1) is planar, and the surface on the opposite side is a convex surface (the curvature radius being −2.96967 mm) The refractive index of lens 15a is 1.648, and the Abbe number is 33.8.

The surface on the phosphor unit 14 side of lens 15b (L2) is a convex surface (the curvature radius being 17 mm) and the surface of the opposite side is also a convex surface (the curvature radius being −17 mm). The refractive index of lens 15b is 1.648, and the Abbe number is 33.8.

The surface on the phosphor unit 14 side of lens 15c is planar, and the surface on the opposite side is concave (the curvature radius being 16.43 mm). The refractive index of lens 15c is 1.517, and the Abbe number is 64.2.

Figure 6B:
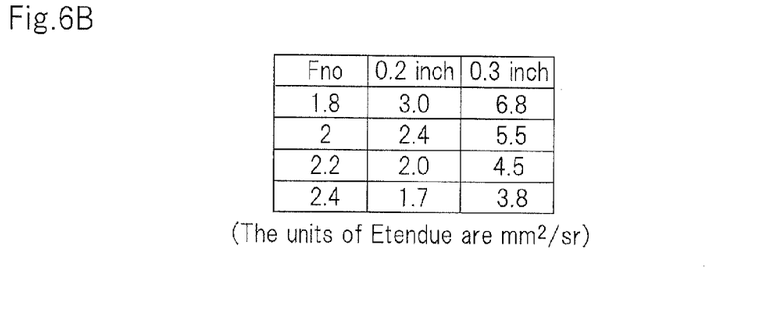
FIG. 6B shows the result of finding etendue of the panel side according to the panel size.
Figure 6C:
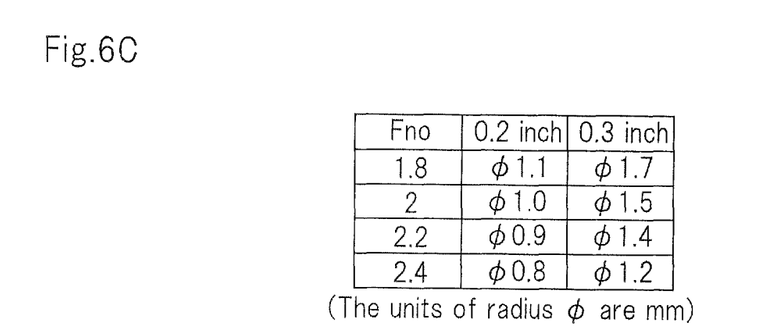
FIG. 6C shows the result of finding the maximum light-emitting area based on the light-source side etendue that accords with panel size.
Figure 6D:
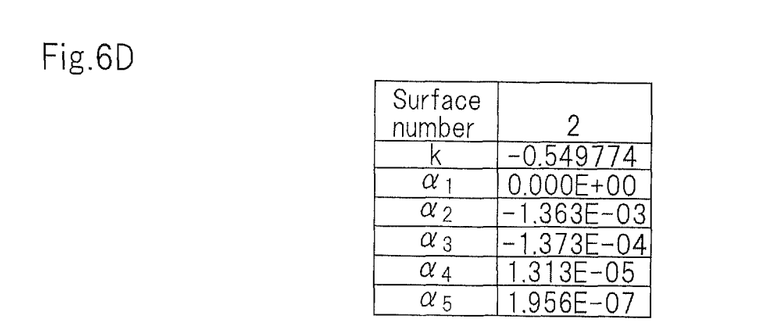
FIG. 6D shows an example of the coefficient relating to the non-spherical surface that corresponds to surface number 2 shown in FIG. 6A.

The surface of surface number 2 is an aspheric surface and is prescribed by a coefficient such as shown in FIG. 6D. Here, k is a conic coefficient, and αi is an aspheric coefficient. The amount of displacement {?} z is given by the following equation:

$$z = \frac{cr^2}{1 + \sqrt{1 - (1+k)c^2 r^2}} + \alpha_1 r^2 + \alpha_2 r^4 + \alpha_3 r^6 + \alpha_4 r^8 + \alpha_5 r^{10} \quad \text{[Equation 1]}$$

$$r^2 = x^2 + y^2$$

According to the light source apparatus of the present exemplary embodiment described hereinabove, phosphor unit 14 is arranged at a position determined by the focal distance that corresponds to the wavelength of the fluorescent light of collimator lens 15, and nearly all of the green fluorescent light (divergent light) that is emitted from phosphor unit 14 can therefore be converted to parallel luminous flux, whereby the optical utilization efficiency can be raised.

In addition, collimator lens 15 is made up of high-dispersion lenses 15a and 15b that have a positive power and low-dispersion lens 15c that has a negative power, whereby the focal distance is changed by wavelength. Accordingly, when phosphor unit 14 is arranged at a position determined by the focal distance of collimator lens 15 that corresponds to the wavelength of the fluorescent light, collimator lens 15 condenses the excitation light from excitation light sources 12 and 13 in a state in which a certain defocus amount is provided on phosphor unit 14. The optical energy density per unit area is thus decreased, whereby the damage to the phosphor caused by the excitation light can be mitigated.

In addition, according to the light source apparatus of the present exemplary embodiment, the need for a rotation drive system such as described in Patent Document 1 is eliminated, whereby the device can be made correspondingly smaller and the cost of the device can be reduced.

The light source apparatus of the present exemplary embodiment further exhibits the following action and effect.

The projection-type display apparatus shown in FIG. 5 suffers from the limitation known as Etendue that is determined by the area of the light irradiation region on phosphor unit 14 and the angle of divergence of fluorescent light that is emitted from this excitation light irradiation region. By making the value of the product of the area of the excitation light irradiation region (more specifically, the area of emission of fluorescent light) and the angle of divergence equal to or less than the value of the product of the area of DMD 46, which is the display element, and the acceptance angle (solid angle) that is determined by the f-number of projection optics 47, fluorescent light from phosphor unit 14 can be taken in and projected without waste.

If the irradiated region (spot size) of the excitation light on phosphor unit 14 is within the range that is restricted by the limitation of etendue, the optical utilization efficiency is substantially the same regardless of the size of the irradiated region.

The relationship between etendue and the spot size of excitation light on phosphor unit 14 is next described in detail.

Etendue that can be received on the DMD 46 (panel) side is first described.

The panel-side etendue is represented by the following equation.

$$E_{Panel} = \frac{S_{Panel} \times \pi}{4 \times Fno^2} \quad \text{[Equation 2]}$$

Here, $E_{panel}$ indicates the panel-side etendue, $S_{panel}$ indicates the area of the panel, and Fno indicates the f-number of projection optics 47.

FIG. 6B shows the results of using the above-described equation to find panel-side etendue that accords with the panel size. FIG. 6B shows the value (mm²/sr) of etendue as the f-number is changed from 1.8 to 2, 2.2, and 2.4 for each of a 0.2-inch panel and a 0.3-inch panel. The aspect ratio of both the 0.2-inch panel and 0.3-inch panel is 4:3.

The etendue that can be received on the phosphor unit 14 (light source) side is next described.

The light source-side etendue is represented by the following equation.

$$E_{Light\ source} = S_{Light\ source} \times \pi \times \sin^2 \theta \quad \text{[Equation 3]}$$

Here, $E_{lightsource}$ indicates the etendue of the light source, $S_{lightsource}$ indicates the light-emitting area of the light source, and θ indicates the solid angle of the light source.

FIG. 6C shows the results of using the above-described equation to find the etendue of the light source according to panel size and to find the maximum light-emitting area from these results. FIG. 6C shows the value (mm) of the maximum light-emitting area when the f-number is changed from 1.8 to 2, 2.2, and 2.4 for each of a 0.2-inch panel and a 0.3-inch panel. For example, when the f-number is 2.4, the light-emitting area (light-emitting size) that can be received in a 0.2-inch panel when the limits of etendue are satisfied is up to φ0.8 mm.

The excitation light that is irradiated into phosphor unit 14 diffuses within the phosphor layer, whereby the light-emitting area of fluorescent light becomes greater than the spot size (beam radius) of the excitation light on phosphor unit 14. Taking this into consideration, if it is assumed that the light-emitting size of phosphor unit 14 is twice the spot size of the excitation light, the conditions of etendue will be satisfied by making the spot size of the excitation light no greater than φ0.4 mm when the panel size is 0.2 inches at an f-number of 2.4. Conversely, if the spot size of the excitation light is no greater than φ0.4 mm, the optical utilization efficiency of the projection-type display apparatus will not drop because the conditions of etendue will be satisfied regardless of the spot size.

Decreasing the spot size of the excitation light results in the potential for damaging the phosphor, and the spot size of the excitation light is therefore preferably increased within the range that satisfies the conditions of etendue.

Collimator lens 15 plays the roles of both condensing excitation light on phosphor unit 14 and converting the fluorescent light to parallel luminous flux. In order to make the spot size of the excitation light as large as possible within the range that satisfies the conditions of etendue, and moreover, to convert the fluorescent light from phosphor unit 14 to parallel luminous flux, the focal distance of collimator lens 15 in the wavelength band of the excitation light is preferably different from the focal distance of collimator lens 15 in the wavelength band of fluorescent light (green).

In the light source apparatus of the present exemplary embodiment, according to considerations that are the reverse of correcting chromatic aberration, configuring collimator lens 15 by combining a lens having positive power and a lens having negative power, and moreover, configuring the lens having positive power from high-dispersion glass and configuring the lens having negative power from low-dispersion glass constructively generates chromatic aberration to cause the focal distance to differ by wavelength.

Collimator lens 15 condenses excitation light on phosphor unit 14 in a certain size of spot within an irradiation region that is determined by the above-described conditions of etendue. In this way, a decrease in optical utilization efficiency can be prevented and damage to the phosphor can be reduced.

For example, by configuring collimator lens 15 such that the focal distance in the wavelength of excitation light (for example, blue) is 5%-10% shorter than the focal distance in the wavelength of fluorescent light (for example, green), the spot of excitation light can be increased to a certain size within the range that satisfies the conditions of etendue. In this way, a decrease of optical utilization efficiency can be reliably prevented and damage to the phosphor of excitation light can be reduced.

The light source apparatus of the present exemplary embodiment can further obtain the following effects.

Typically, when chromatic aberration is controlled only by a lens having positive power, this control depends only on the Abbe number. The Abbe number depends on the glass material that is used in the lens, and as a result, a collimator lens that is made up only of lenses having a positive power raises the problem of very limited freedom of design relating to the control of chromatic aberration.

According to the light source apparatus of the present exemplary embodiment, chromatic aberration of collimator lens 15 is controlled by the combination of a lens having positive power and a lens having negative power. In this case, chromatic aberration can be controlled by the relation of the Abbe number of the lens having positive power and the Abbe number of the lens having a negative power, whereby the degree of freedom in design relating to the control of chromatic aberration is increased.

The light source apparatus of the present exemplary embodiment described hereinabove is one example of the present invention, and its configuration is open to modifications that will be clear to one of ordinary skill in the art within a scope that does not depart from the gist of the invention.

For example, the number of lenses of each of high-dispersion lenses having a positive power and low-dispersion lenses having a negative power may be one or may be two or more.

In addition, the number of excitation light sources is not limited to two. The number of excitation light sources may be one or may be three or more.

A lighting apparatus in which the light source apparatus of the present invention is applied is next described.

Figure 7:
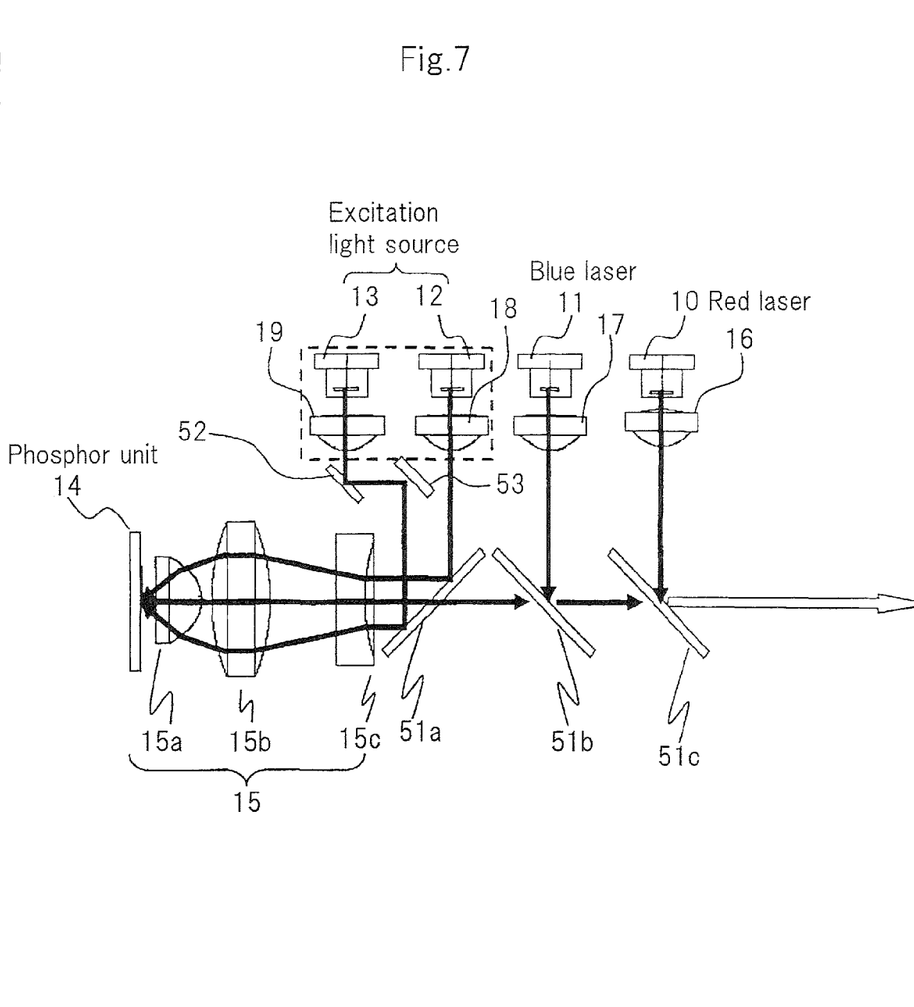
FIG. 7 is a schematic view showing the configuration of the lighting apparatus that is equipped with the light source apparatus of the present invention.

FIG. 7 is a schematic view showing the configuration of a lighting apparatus in which the light source apparatus of the present invention is applied.

Referring to FIG. 7, the lighting apparatus is an apparatus used in a projection-type display apparatus such as a projector and includes: red laser 10, blue laser 11, excitation light sources 12 and 13, phosphor unit 14, collimator lenses 15-19, dichroic mirrors 51a, 51b, and 51c, and light path changing mirrors 52 and 53.

Excitation light source 12 and 13, phosphor unit 14, collimator lens 15, and dichroic minor 51a are the same as the components described in the light source apparatus shown in FIG. 1 and redundant explanation is therefore here omitted.

In FIG. 7, the light path of the red laser light that is supplied from red laser 10, the light path of the blue laser light that is supplied from blue laser 11, the light path of the excitation light supplied from excitation light sources 12 and 13, and the light path of the green fluorescent light that is emitted from phosphor unit 14 are each shown by solid lines (heavy lines) with arrows. The white arrow is light in which the red laser light, blue laser light, and green fluorescent light have been combined and is the output light of the lighting apparatus of the present exemplary embodiment. All of the light paths of each color show only the light paths of the center rays and are actually made up of luminous flux composed of a plurality of rays.

Red laser 10 and blue laser 11 are solid-state light sources such as LEDs or semiconductor lasers such as a laser diode. Red laser 10 supplies S-polarized laser light (hereinbelow referred to as simply red laser light) having a peak wavelength in the red wavelength band. Blue laser 11 supplies S-polarized laser light (hereinbelow referred to as simply blue laser light) having a peak wavelength in the blue wavelength band. The peak wavelength of the output light of excitation light sources 12 and 13 may be the same as that of the blue laser 11, or may be different.

Collimator lens 16 converts the red laser light (divergent light) that is supplied from red laser 10 to parallel luminous flux. Collimator lens 17 converts the blue laser light (divergent light) supplied from blue laser 11 to parallel luminous flux. Collimator lens 18 converts the excitation light (divergent light) supplied from excitation light source 12 to parallel luminous flux. Collimator lens 19 converts the excitation light (divergent light) supplied from excitation light source 13 to parallel luminous flux.

Red laser 10, blue laser 11, and excitation light sources 12 and 13 are each arranged to emit light in the same direction. More specifically, each of the optical axes of red laser 10, blue laser 11, and excitation light sources 12 and 13 is mutually parallel.

All of dichroic mirrors 51a-51c are made up of dielectric multilayer films. Dichroic mirrors 51a-51c are arranged to intersect the center ray of the green fluorescent luminous flux that is emitted from phosphor unit 14. Dichroic mirrors 51a-51c are arranged in this order from the side of phosphor unit 14. Dichroic mirrors 51a-51c may be arranged orthogonal to the plane that contains the center ray of fluorescent luminous flux.

The film characteristics of dichroic mirrors 51a and 51b are the same. In other words, dichroic mirrors 51a and 51b both have the characteristics shown in FIG. 2.

The film characteristics of dichroic mirror 51c differ from the characteristics of dichroic mirrors 51a and 51b.

Figure 8:
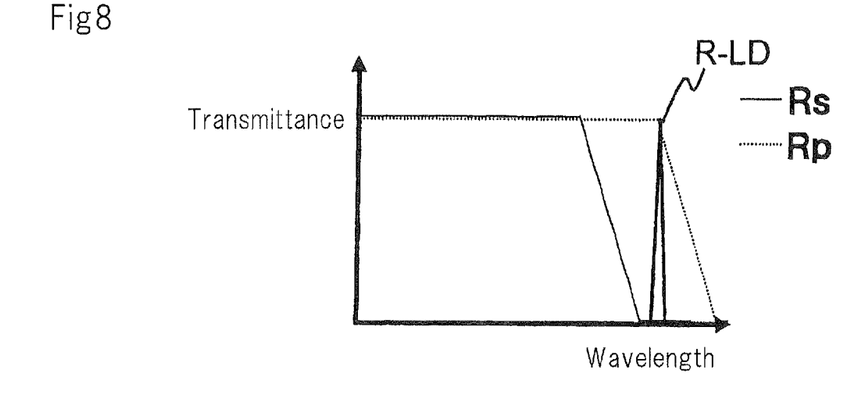
FIG. 8 is a graph showing spectral transmission characteristics with respect to P-polarized light and S-polarized light of the dichroic mirror that is located in the lattermost stage of the three dichroic mirrors of the lighting apparatus shown in FIG. 7.

FIG. 8 shows the spectral transmission characteristics with respect to P-polarized light and S-polarized light of dichroic mirror 51c. In FIG. 8, the solid lines show the spectral transmission characteristics with respect to S-polarized light, and the dotted lines show the spectral transmission characteristics with respect to P-polarized light. R-LD is the spectrum of red laser light that is supplied from red laser 10.

The cutoff wavelength of dichroic mirror 51c with respect to light that is entered as S-polarized light is set to reflect light of wavelength that is equal to or greater than the red wavelength band and transmit light of other wavelength bands (including green and blue wavelength bands). The cutoff wavelength of dichroic mirror 51c with respect to light that is entered as P-polarized light is set to wavelengths that are longer than the cutoff wavelength with respect to S-polarized light. In this case as well, the setting of the cutoff wavelength can be adjusted by, for example, the material, number of layers, film thickness, and refractive index of the dielectric multilayer films.

In dichroic mirror 51c that has the spectral transmission characteristics shown in FIG. 8, S-polarized light of wavelength that is equal to or greater than the red wavelength band is reflected, and S-polarized light and P-polarized light of wavelengths of the green and blue wavelength bands pass dichroic mirror 51c.

In the lighting apparatus of the present exemplary embodiment, excitation light that is supplied from excitation light source 12 and that is converted to parallel luminous flux by collimator lens 18 enters to dichroic mirror 51a at an angle of incidence of approximately 45°. The excitation light that is supplied from excitation light source 13 and that is converted to parallel luminous flux by collimator lens 19 enters, by way of mirrors 52 and 53, to dichroic mirror 51a at an angle of incidence of approximately 45°.

Dichroic mirror 51a reflects the incident excitation light in the direction of phosphor unit 14. The excitation light that is reflected by dichroic mirror 51a is condensed in the phosphor region of phosphor unit 14 by way of collimator lens 15.

In the phosphor region of phosphor unit 14, the phosphor undergoes excitation by the irradiation of excitation light. Green fluorescent light is emitted from the excited phosphor.

The green fluorescent light (divergent light) that is emitted from the phosphor region of phosphor unit 14 is converted to parallel luminous flux by collimator lens 15 and then enters into dichroic mirror 51*a*. The incident green fluorescent light passes through Dichroic mirror 51*a*.

The transmitted luminous flux of the green fluorescent light from dichroic mirror 51*a* enters into dichroic mirror 51*b* at an angle of incidence of approximately 45°. Dichroic mirror 51*b* is arranged at the intersection of the optical axis of blue laser 11 and the luminous flux of the green fluorescent light from phosphor unit 14 (more specifically, the optical axis of the system that includes phosphor unit 14 and collimator lens 15). Blue laser light from blue laser 11 enters to dichroic mirror 51*b* at an angle of incidence of approximately 45°.

Dichroic mirror 51*b* reflects the blue laser light from blue laser 11 toward dichroic mirror 51*c* and transmits the transmitted luminous flux of the green fluorescent light from dichroic mirror 51*a*, whereby the blue laser light from blue laser 11 and the green fluorescent light from dichroic mirror 51*a* are color-combined.

The luminous flux from dichroic mirror 51*b* (blue laser light+green fluorescent light) enters into dichroic mirror 51*c* at an angle of incidence of approximately 45°. Dichroic mirror 51*c* is arranged at the intersection of the optical axis of red laser 10 and the luminous flux of green fluorescent light from phosphor unit 14 (more specifically, the optical axis of the system that includes phosphor unit 14 and collimator lens 15). The red laser light from red laser 10 enters into dichroic mirror 51*c* at an angle of incidence of approximately 45°.

Dichroic mirror 51*c* reflects red laser light from red laser 10 and transmits the luminous flux (blue laser light+green fluorescent light) from dichroic mirror 51*b*, whereby the red laser light from red laser 10 and the luminous flux from dichroic mirror 51*b* (blue laser light+green fluorescent light) are color-combined.

Dichroic mirrors 51*b* and 51*c* are color-combining means that combine blue laser light, green fluorescent light, and red laser light. The luminous flux from dichroic mirror 51*c* (blue laser light+green fluorescent light+red laser light) is the output light of the lighting apparatus of the present exemplary embodiment.

The above-described lighting apparatus of the present exemplary embodiment also exhibits the same action and effects as the previously described exemplary embodiment of the light source apparatus.

The lighting apparatus of the present exemplary embodiment described hereinabove is also open to the various modifications described in the exemplary embodiment of the previously described light source apparatus.

In addition, dichroic mirrors 51*a*-51*c* may be made up of a rectangular-shaped dichroic prism.

The dichroic prism is made up of first and second right-angle prisms, a trapezoid-shaped prism, and a parallelogram-shaped prism. Each of the first and second right-angle prisms has right-angled surfaces and an inclined surface, the inclined surface of the first right-angle prism being joined to one of the opposing inclined surfaces of the trapezoid-shaped prism and a dichroic film that corresponds to dichroic mirror 51*a* being formed on this bonding surface.

One of the opposing inclined surfaces of the parallelogram-shaped prism is bonded to the other opposing inclined surface of the trapezoid-shaped prism, and a dichroic film that corresponds to dichroic mirror 51*b* is formed on this bonding surface.

The other opposing inclined surface of the parallelogram-shaped prism is bonded to the inclined surface of the second right-angle prism, and a dichroic film that corresponds to dichroic mirror 51*c* is formed on this bonding surface.

Alternatively, the dichroic prism may be made up of first to third right-angle prisms and a parallelogram-shaped prism.

Each of the first to third right-angle prisms has right-angled surfaces and an inclined surface, the inclined surface of the first right-angle prism being bonded to one of the right-angled surfaces of the second right-angle prism, and a dichroic film that corresponds to dichroic mirror 51*a* being formed on this bonding surface.

One of the two opposing surfaces of the parallelogram-shaped prism is bonded to the other right-angled surface of the second right-angle prism, and a dichroic film that corresponds to dichroic mirror 51*b* is formed on this bonding surface.

The other of the two opposing surfaces of the parallelogram-shaped prism is bonded to the inclined surface of the third right-angle prism, and a dichroic film that corresponds to dichroic mirror 51*c* is formed on this bonding surface.

Alternatively, a cross-dichroic prism may be used in place of dichroic mirrors 51*b* and 51*c* in the lighting apparatus of the present exemplary embodiment.

The cross-dichroic prism is made up of first to fourth right-angle prisms in which surfaces that form right angles are bonded together. A uniform first plane is formed by the bonding surfaces of the first and second right-angle prisms and the bonding surfaces of the third and fourth right-angle prisms, and a dichroic film that has the same film characteristics as dichroic mirror 51*b* is formed on this first plane.

A uniform second plane that intersects the first plane is formed by the bonding surfaces of the first and fourth right-angle prisms and the bonding surfaces of the second and third right-angle prisms, and a dichroic film that has the same film characteristics as dichroic mirror 51*c* is formed on this second plane.

In addition, optics or light guide means for guiding light that is supplied from dichroic mirror 51*c* may be provided in the lighting apparatus of the present exemplary embodiment.

Still further, the positions of dichroic mirrors 51*b* and 51*c* may be reversed. In other words, dichroic mirrors 51*a*, 51*c*, and 51*b* may be arranged in this order from the side of phosphor unit 14. In this case, the positions of red laser 10 and blue laser 11 are also reversed.

Still further, a parallelogram-shaped prism may be used in place of mirrors 52 and 53 for changing light paths.

Another Exemplary Embodiment

The light source apparatus of another exemplary embodiment includes: a phosphor unit that emits fluorescent light by the excitation caused by excitation light, an excitation light source unit that supplies excitation light, a reflection unit that reflects excitation light that is supplied from the excitation light source unit toward the phosphor unit and that transmits fluorescent light that is emitted from the phosphor unit, and a collimator lens that is provided between the reflection unit and the phosphor unit and whose focal distance differs according to wavelength.

The phosphor unit is arranged at a position that is determined by the focal distance of the collimator lens that corresponds to the wavelength of fluorescent light that is emitted from the phosphor unit. The collimator lens includes at least one first lens having negative power and at least one second lens having positive power, an Abbe number of the second lens being lower than that of the first lens.

The excitation light source unit may be made up of excitation light sources 12 and 13 shown in FIG. 1. The reflection unit may be made up of dichroic mirror 51*a* shown in FIG. 1. The collimator lens may be made up of collimator lens 15 shown in FIG. 1.

The light source apparatus of this other exemplary embodiment also exhibits the same action and effect as the previously described exemplary embodiments.

The light source apparatus of the present invention described hereinabove can be applied to all types of projection-type display apparatuses, of which projectors are representative.

The projection-type display apparatus includes: first and second solid-state light sources whose emitted light colors differ from each other, color-combining means that combines fluorescent light supplied from a light source apparatus and first and second light that are supplied from first and second solid-state light sources, a display element that spatially modulates the combined light that is combined by the color-combining means to generate modulated light, and projection optics that project the modulated light that was generated by the display element. The display element is, for example, a DMD or liquid crystal panel.

Figure 9:
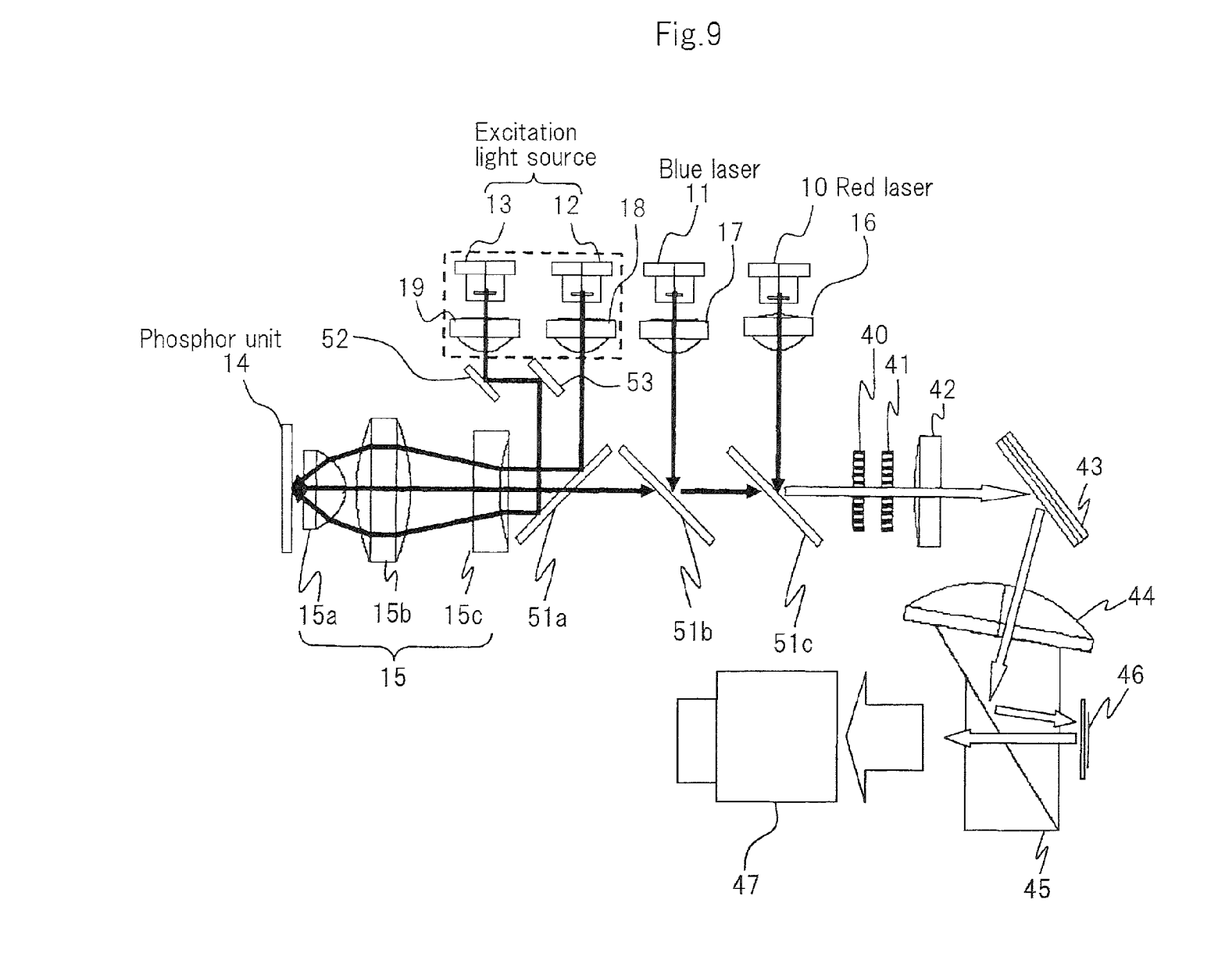
FIG. 9 is a schematic view showing an example of the projection-type display device that is equipped with the light source apparatus of the present invention.

FIG. 9 shows an example of the projection-type display apparatus that is equipped with the light source apparatus of the present invention.

Referring to FIG. 9, the projection-type display apparatus includes: DMD 46 that is the display element, the lighting apparatus of the second exemplary embodiment, optics for guiding the light from the lighting apparatus to DMD 46, and projection optics 47 that project the image light (modulated light) that was formed by DMD 46 onto a screen (not shown in the figures).

The optics include fly-eye lenses 40 and 41, field lens 42, mirror 43, condenser lens 44, and total internal reflection (TIR) prism 45. These components are the same as shown in FIG. 5.

By controlling the timing of lighting excitation light sources 12 and 13, red laser 10, and blue laser 11, luminous flux of each of the colors red, green, and blue is emitted from color-combining prism 20 in time divisions. Image light of each color can be obtained by using DMD 46 to spatially modulate this luminous flux of each color that is emitted in time divisions.

Light source apparatuses of other exemplary embodiments described hereinabove may be used in the above-described projection-type display apparatus.

What is claimed is:

1. A light source apparatus comprising:
   a phosphor unit that emits fluorescent light by an excitation caused by an excitation light;
   an excitation light source unit that supplies said excitation light;
   a reflection unit that reflects said excitation light that is supplied from said excitation light source unit toward said phosphor unit and that transmits said fluorescent light that is emitted from said phosphor unit; and
   a collimator lens that is provided between said reflection unit and said phosphor unit, having a focal distance which differs according to wavelength;
   wherein:
   said phosphor unit is disposed at a position determined by a focal distance of said collimator lens at the wavelength of said fluorescent light that is emitted from said phosphor unit; and
   said collimator lens includes at least one first lens having a negative power and at least one second lens having a positive power, a Abbe number of said second lens being smaller than that of said first lens.

2. The light source apparatus as set forth in claim 1, wherein said second lens is disposed on a phosphor unit side of said first lens.

3. The light source apparatus as set forth in claim 2, wherein said collimator lens is configured such that the focal distance at the wavelength of said excitation light that is supplied from said excitation light source unit is 5% to 10% shorter than a focal distance at the wavelength of said fluorescent light that is emitted from said phosphor unit.

4. The light source apparatus as set forth in claim 2, wherein said excitation light source unit includes first and second excitation light sources, and the center ray of excitation light from said first excitation light source that is reflected by said reflection unit and the center ray of excitation light from said second excitation light source that is reflected by said reflection unit are linearly symmetric around the optical axis of said collimator lens.

5. A lighting apparatus comprising:
   a light source apparatus as set forth in claim 2;
   first and second solid-state light sources which emit first and second light, wherein said first and second light are different colors from each other; and
   a color-combining unit that combines said fluorescent light supplied from said light source apparatus and said first and second light supplied from said first and second solid-state light sources.

6. A projection display apparatus comprising:
   the light source apparatus as set forth in claim 2;
   first and second solid-state light sources which emit first and second light, wherein said first and second light are different colors from each other;
   a color-combining unit that combines said fluorescent light that is supplied from said light source apparatus and said first and second light that is supplied from said first and second solid-state light sources to generate combined light;
   a display element that spatially modulates the combined light that is combined by said color-combining unit to generate modulated light; and
   projection optics that project said modulated light that was generated by said display element.

7. The light source apparatus as set forth in claim 1, wherein said collimator lens is configured such that the focal distance at the wavelength of said excitation light that is supplied from said excitation light source unit is 5% to 10% shorter than a focal distance at the wavelength of said fluorescent light that is emitted from said phosphor unit.

8. The light source apparatus as set forth in claim 7, wherein said excitation light source unit includes first and second excitation light sources, and the center ray of excitation light from said first excitation light source that is reflected by said reflection unit and the center ray of excitation light from said second excitation light source that is reflected by said reflection unit are linearly symmetric around the optical axis of said collimator lens.

9. A lighting apparatus comprising:
   a light source apparatus as set forth in claim 7;
   first and second solid-state light sources which emit first and second light, wherein said first and second light are different colors from each other; and
   a color-combining unit that combines said fluorescent light supplied from said light source apparatus and said first and second light supplied from said first and second solid-state light sources.

10. A projection display apparatus comprising:
the light source apparatus as set forth in claim 7;
first and second solid-state light sources which emit first and second light, wherein said first and second light are different colors from each other;
a color-combining unit that combines said fluorescent light that is supplied from said light source apparatus and said first and second light that is supplied from said first and second solid-state light sources to generate combined light;
a display element that spatially modulates the combined light that is combined by said color-combining unit to generate modulated light; and
projection optics that project said modulated light that was generated by said display element.

11. The light source apparatus as set forth in claim 1, wherein said excitation light source unit includes first and second excitation light sources, and the center ray of excitation light from said first excitation light source that is reflected by said reflection unit and the center ray of excitation light from said second excitation light source that is reflected by said reflection unit are linearly symmetric around the optical axis of said collimator lens.

12. A lighting apparatus comprising:
a light source apparatus as set forth in claim 11;
first and second solid-state light sources which emit first and second light, wherein said first and second light are different colors from each other; and
a color-combining unit that combines said fluorescent light supplied from said light source apparatus and first and second light supplied from said first and second solid-state light sources.

13. A projection display apparatus comprising:
the light source apparatus as set forth in claim 11;
first and second solid-state light sources which emit first and second light, wherein said first and second light are different colors from each other;
a color-combining unit that combines said fluorescent light that is supplied from said light source apparatus and said first and second light that is supplied from said first and second solid-state light sources to generate combined light;
a display element that spatially modulates the combined light that is combined by said color-combining unit to generate modulated light; and
projection optics that project said modulated light that was generated by said display element.

14. A lighting apparatus comprising:
a light source apparatus as set forth in claim 1;
first and second solid-state light sources which emit first and second light, wherein said first and second light are different colors from each other; and
a color-combining unit that combines said fluorescent light supplied from said light source apparatus and said first and second light supplied from said first and second solid-state light sources.

15. A projection-type display apparatus comprising:
the light source apparatus as set forth in claim 1;
first and second solid-state light sources which emit first and second light, wherein said first and second light are different colors from each other;
a color-combining unit that combines said fluorescent light that is supplied from said light source apparatus and said first and second light that is supplied from said first and second solid-state light sources to generate combined light;
a display element that spatially modulates the combined light that is combined by said color-combining unit to generate modulated light; and
projection optics that project said modulated light that was generated by said display element.

\* \* \* \* \*